(12) United States Patent
Huttner et al.

(10) Patent No.: US 12,465,986 B2
(45) Date of Patent: Nov. 11, 2025

(54) ECM SYSTEM, HAVING A HOLDER AND A MACHINING PLATFORM

(71) Applicant: MTU Aero Engines AG, Munich (DE)

(72) Inventors: Roland Huttner, Jesenwang (DE); Markus Zeis, Munich (DE); Christian Doll, Markt Indersdorf (DE); Rolf Kneilling, Schiltberg (DE)

(73) Assignee: MTU Aero Engines AG, Munich (DE)

( * ) Notice: Subject to any disclaimer, the term of this patent is extended or adjusted under 35 U.S.C. 154(b) by 675 days.

(21) Appl. No.: 17/637,871

(22) PCT Filed: Aug. 13, 2020

(86) PCT No.: PCT/DE2020/000188
§ 371 (c)(1),
(2) Date: Jul. 22, 2022

(87) PCT Pub. No.: WO2021/037294
PCT Pub. Date: Mar. 4, 2021

(65) Prior Publication Data
US 2022/0355405 A1 Nov. 10, 2022

(30) Foreign Application Priority Data
Aug. 29, 2019 (DE) ...................... 10 2019 213 013.5

(51) Int. Cl.
*B23H 3/04* (2006.01)
*B23H 11/00* (2006.01)

(52) U.S. Cl.
CPC ............ *B23H 11/003* (2013.01); *B23H 3/04* (2013.01); *B23H 2400/00* (2013.01); *B23H 2500/00* (2013.01)

(58) Field of Classification Search
None
See application file for complete search history.

(56) References Cited

U.S. PATENT DOCUMENTS

| 3,668,105 A | 6/1972 | Abt |
| 2004/0256780 A1 | 12/2004 | Lang |

(Continued)

FOREIGN PATENT DOCUMENTS

| CN | 104607732 A | 5/2015 |
| DE | 102004018120 A1 | 11/2005 |

(Continued)

OTHER PUBLICATIONS

English translation DE 102015102720 (Year: 2016).*

*Primary Examiner* — Stefanie S Wittenberg
(74) *Attorney, Agent, or Firm* — Hinckley, Allen & Snyder, LLP; David Robert Josephs

(57) ABSTRACT

The invention relates to an ECM system comprising a holder for the arranging of at least one component to be machined and at least one machining station for the electrochemical machining of the at least one component at at least one machining position. The ECM system has a positioning apparatus, which is designed to mount, in a predefined position, a machining platform arranged on the positioning apparatus, and the machining platform comprises at least one machining station having at least one electrode arranged thereon, which electrode can be moved along a machining path in order to machine the at least one component that can be arranged on the holder.

10 Claims, 5 Drawing Sheets

(56) References Cited

U.S. PATENT DOCUMENTS

2016/0074952 A1    3/2016  Huttner et al.
2016/0114444 A1*   4/2016  Hofmann ........... B23Q 3/15536
                                                           483/1

FOREIGN PATENT DOCUMENTS

| DE | 102008043940 A1 | 5/2010 |
| DE | 102013005940 A1 | 10/2014 |
| DE | 102013016125 B3 | 1/2015 |
| DE | 102015102720 A1 | 8/2016 |

* cited by examiner

ECM SYSTEM, HAVING A HOLDER AND A MACHINING PLATFORM

BACKGROUND OF THE INVENTION

The invention relates to an ECM system having a holder and a clamping apparatus for at least one component to be machined and having a machining platform for the electrochemical machining of the at least one component at at least one machining position.

EMC systems serve for the electrochemical machining (elysing) of components produced from electrically conductive materials. In a method for the electrochemical machining of a component, such as electrochemical machining (ECM: "electrochemical machining"), precise electrochemical machining (PEM: "precise electrochemical machining") or pulsed electrochemical machining (PECM: "pulsed electrochemical machining"), an electrically conductive metal is abraded via an electrochemical process. In this case, a cathode (electrode, tool) is moved relative to an anode (component) and is guided thereby "into" or "through" the component. Simultaneously, an electrolyte is supplied into the gap that remains between the cathode and the anode, said gap particularly serving also for removing the process products that form. The feed rate, which amounts to between 0.05 mm/min and 10 mm/min depending on the type of method employed, is the same as the rate at which electrons passing through the gap abrade material from the component. The desired form defined in advance through the electrode is thereby formed in the component.

In order to make possible a precise machining of a component, a precise positioning of the component to be machined in the EMC system is necessary, in particular relative to the electrode, i.e., the tool. This particularly represents a challenge for those components that require a multiple machining in different arrangements, such as, for example, with regard to place and positioning relative to the center, or require an angle of division. Thus, for example, producing profile grooves formed on the periphery of disc-shaped components requires a high machine construction expenditure, which increases linearly with the number of machining positions. By way of example, for machining such a structure, four degrees of freedom are necessary: the radial position of the machining, the angular position thereof, the sink angle, and the arrangement of a feed axis of the electrode. Establishing these degrees of freedom in an ECM system is very complex and hardly expandable. Consequently, only a limited number of machining positions are possible with the currently employed means for positioning components and tools in an ECM system.

SUMMARY OF THE INVENTION

Proceeding therefrom, an object of the present invention is to propose an ECM system having an improved arrangement and positioning of a component and/or of at least one tool or of the machining position. According to the invention, this is achieved by the teaching of the independent claims. Advantageous embodiments of the invention are the subject of the dependent claims.

For achieving the object, an ECM system having a holder for arranging at least one component to be machined and having at least one machining station for the electrochemical machining of the at least one component at at least one machining position is proposed. The ECM system has a positioning apparatus that can be set up in three-dimensional space, which apparatus is designed to mount a machining platform arranged thereon in a predetermined position after setting up the positioning apparatus. The machining platform has at least one machining station having at least one electrode arranged thereon, which can travel along a machining path for machining at least one component that can be arranged on the holder.

The holder of the ECM system is designed, for example, so that a defined change in position can be carried out therewith, particularly with a component arranged thereon, for example, a change in position between two machining steps. In this case, in particular the holder can be rotatable or can be designed to be movable in at least one region, particularly in a region defined in advance.

A positioning apparatus that can be set up in space is arranged at the ECM system. For setting up spatially, the positioning apparatus has a suitable number of degrees of freedom, in which said apparatus can be wholly or partially spatially adjusted. In the present context, "setting up" denotes in general the particularly spatial positioning and fixing in place particularly of configured elements that can be "set up". Thus, one or more elements of the positioning apparatus that is designed, for example, as a single-part or multipart apparatus, in particular can be moved, rotated, inclined, tipped, or, in particular, can be moved in a combination of such movements in a suitable way in three dimensions, and can be fixed at or in the desired position. The positioning apparatus can be designed, for example, as a single-part or multipart apparatus. By way of example, the positioning apparatus can also have at least one element that has only a limited number of degrees of freedom, such as one or two degrees of freedom, or, in addition to at least one movable element, also at least one rigidly arranged element.

After it is set up, the positioning apparatus is designed to mount a machining platform arranged thereon in a predetermined position. Here, the positioning apparatus defines the spatial position of the machining platform arranged thereon, for example, by system surfaces acting in a form-fitting or force-fitting manner arranged at the one or more interfaces between the positioning apparatus and the machining platform. For example, the machining platform can be placed on the positioning apparatus in a form-fitting and/or force-fitting manner, so that a rapid and precise arrangement of a machining platform in a predetermined or defined position at the positioning apparatus, in particular opposite the holder, is possible without additional fastening means. This makes possible a precise machining of a component arranged in a particular position on the holder. The system surfaces of the positioning apparatus, in particular acting in a form-fitting or force-fitting manner or the elements thereof can be set up here opposite the ECM system, i.e., they are designed so that they can be adjusted in their spatial position. In particular, for a simplified setting up, the positioning apparatus can have a so-called zero-point clamping system (NPSS), which serves for the rapid and precise fixing in place of the set-up position.

The ECM system further has a machining platform, which can be arranged at the positioning apparatus and can be mounted there, for the electrochemical machining of the at least one component at at least one machining position. The machining platform can be arranged in the positioning apparatus particularly after the setting up (=positioning and fixing in place) of said apparatus, in order to be mounted in a predetermined position at the positioning apparatus, particularly due to the setting up of said apparatus.

Such a machining platform has one or more machining stations arranged thereon for the electrochemical machining of components; at least one electrode can be arranged on each of said stations. In this case, at one machining platform, one, two, three, four, five, six, seven, eight, nine, ten, eleven, twelve or more operating machining stations can be provided, independent of one another. It is also possible, however, that two or more such machining stations are synchronized in each case, or are operable dependent on one another in another way. The at least one electrode arranged at a machining station is able to travel along a machining path, in particular a predefined path, for machining the at least one component. For this purpose, a machining station has a suitable feed apparatus or is effectively connected to such an apparatus. The use of a machining platform having several machining stations that can be arranged thereon particularly makes possible a parallel machining of components with a plurality of electrodes.

In one embodiment, necessary supply systems are integrated in the machining station, systems such as, for example, an electrolyte supply, which provides electrolyte to the gap between the electrode and the component to be machined. In this case, in particular, the machining platform has corresponding media connections for supplying electrolyte and power to set-ups arranged at the machining platform. These can be provided, for example, with quick-release couplings and/or so-called multi-contact plugs in order to simplify a connection of the machining platform at the supply systems of the ECM system. In addition to connections to supply systems for power or electrolyte, for example, at least one connection can also be provided to a system for supplying compressed air and/or hydraulic fluid.

The proposed ECM system permits an improved arrangement and positioning of a component to be machined and/or of a machining station arranged on a machining platform for carrying out an electrochemical machining. In particular, by way of positioning the machining platform by means of a positioning apparatus that can be set up as well as positioning the holder, a rapid and precise setting up of the ECM system is allowed. For improving or assuring the precision of the machining, the machining platform can be adjusted, re-measured, and/or serviced at a measuring machine having a positioning or at a suitably shaped holder.

One embodiment of the ECM system has a holder, the spatial position of which can be adjusted relative to the positioning apparatus. For this purpose, for example, the holder can be moved, rotated, inclined, tipped to a suitable extent, or, in particular, can be moved in a combination of such movements in a suitable way in three dimensional space, and can be fixed in place at or in the desired position. In particular, the position of the holder in this case is fixed in place or adjustable directly opposite the positioning apparatus, which has been set up in a particular way, with the aid of an adjusting apparatus. This simplifies a precise machining of a component arranged in a particular position at the holder. In particular, the holder may have a so-called zero-point clamping system (NPSS) for simplified fixation in the adjusted position.

In one embodiment of the ECM system, several machining platforms can be arranged interchangeably at the positioning apparatus. The simple arrangement and positioning of a machining platform via the positioning apparatus at the ECM system permits a rapid and simple setting up of the ECM system for different machining processes or, for example, in the case of disruptions of a machining station or a machining platform.

One embodiment of the ECM system has a clamping apparatus for at least one component to be machined, at which the at least one component can be arranged in a position defined in advance and which can be arranged together with the at least one component in a predefined position at the holder. In addition to a predominantly force-fitting arrangement of a component at the clamping apparatus ("clamping"), said clamping can also be executed so that a component can be arranged thereon in a predominantly or completely form-fitting manner.

The at least one component can be arranged in a position defined in advance at the clamping apparatus. In this case, the at least one component, for example, can be arranged or held in a predefined position in a form-fitting and/or force-fitting manner at the clamping device, wherein the component and the clamping apparatus can be designed as rigidly connectible to one another. A predefined position of the at least one component at the clamping apparatus makes possible a simple holder for the at least one component in a predetermined position at the holder, as soon as said holder, together with the clamping apparatus, is arranged at the holder, particularly in a form-fitting and/or force-fitting manner. Additionally, at least one component arranged in a provided position at a clamping apparatus, and, together with the latter, can be exchanged simply and rapidly for at least another component in a provided position at a clamping apparatus, in particular without the necessity of a repeated setting up of the holder relative to the positioning apparatus and/or opposite the machining platform.

Due to the fact that the clamping apparatus, together with the at least one component, can be arranged in a predefined position at the holder, opposite which the positioning apparatus is aligned, therefore, the clamping apparatus together with the at least one component is also arranged in a predefined position relative to the set-up positioning apparatus or opposite the machining platform arranged at the set-up positioning apparatus. In this case, the predefined position between the holder and the clamping apparatus or the at least one component can be provided, for example, via a form-fit and/or force-fit connection.

In one embodiment of the ECM system, a positionable electrode carrier is arranged at the at least one machining station, and at least one electrode can be arranged in a predetermined position on said carrier. In particular, such an electrode carrier is adjustable relative to the set-up positioning apparatus or relative to the holder, for example, by means of an adjusting apparatus provided for this purpose. In particular, it can also be provided that the positionable electrode carrier can be set up by means of or indirectly by at least one electrode that can be arranged on said carrier. In particular, for a simplified setting up or adjusting, the electrode carrier can have a zero-point clamping system (NPSS), which supports a rapid and precise establishing of the set-up position.

In one embodiment of the ECM system, the holder is defined as movable around an axis of rotation and/or along at least one movement path, in order to particularly move at least one component arranged thereon into a machining position. By way of example, several identical machining steps can be carried out at a machining station at different positions of a component. For this, after a first machining step, a component can be moved into another position in order to now repeat the machining step at the component position found at the machining station. This is particularly advantageous in the case of machining steps that follow one another at specific distances or angular positions, since the proposed design makes possible a precise movement of at least one exactly positioned component. Additionally, at least one component arranged at the holder can also be moved from one machining station to at least one other machining station. The proposed embodiment thus makes possible a high accuracy of the positioning of several machining steps on at least one component.

In one embodiment of the ECM system, several machining stations are arranged at the machining platform, and said stations can be operated in parallel and particularly independently of one another. In this way, a machining of a component can be carried out at several positions arranged at the component, said machining being parallel or overlapping in time and at positions locally separated from one another. A simultaneous machining of at least one component at several machining stations makes possible, on one hand, a reduction in manufacturing time and, on the other, a higher precision of the machining that is carried out, which is based on a smaller number of changes in the position of the component. In addition, there exists the possibility of producing in parallel different features or machining steps on the component. Further, the economics of an ECM system can be improved by a greater number of machining stations employed. As distinguished from the use of a complete set of tools, in the case of employing a machining platform particularly having several machining stations, individual electrodes can be employed in parallel. The use of several electrodes with smaller machining extent makes possible lower tool costs with higher tool quality, whereby a higher quality of machining is achievable.

In one embodiment of the ECM system, the at least one machining station arranged at the machining platform has a drive device for driving the electrode or the electrode carrier on a provided movement path that is fixed in place. Correspondingly, the drive device for the electrode is designed as integrated into the machining platform, so that by a change of the machining platform, the entire machining station including the drive device and particularly including necessary supply apparatus can be changed. Therefore, at one machining position, an automated feed axis can be employed for the machining, and the arrangement thereof at the machining platform, for example, the lowering angle, the angular position, and the position of the machining, is given in advance. Additionally, machining paths having additional axes can be provided, of course, for producing more complex configurations. Therefore, for example, a machining is possible at an angle that is oblique and/or parallel to a component axis, and, with an active axis of rotation, spiral-shaped machinings also can be executed.

In one embodiment of the ECM system, a component to be machined is particularly shaped as rotationally symmetric and is provided for a machining at the periphery of the component. The machining path in this case corresponds to a straight line, in particular, which is arranged at an inclination to the axis of rotation of the component. For example, for such a machining, a corresponding component is arranged at a holder designed to be able to rotate around an axis of rotation, in particular, so that the axis of rotation of the component is aligned coaxially to the axis of rotation of the holder. In one exemplary machining, the machining path of one machining station corresponds to a straight line, which can also be particularly arranged at an inclination to the axis of rotation of the component. In the case of this arrangement, the component can be rotated by a predetermined angle corresponding to a provided division each time between two machining steps, in order to again carry out the machining at a position on the component that is rotated by the predetermined angle. In this arrangement, the initial position of the component is advantageously arranged underneath the machining site, whereby any additionally necessary axes can be avoided. Particularly for a machining over the entire extent of the component, several machining stations provided for the same machining steps are arranged at the machining platform, so that the component is to be rotated only for a part of a revolution, corresponding to the number of machining stations, so that, for example, in the case of four machining stations, each part is rotated one-quarter of a revolution.

In one embodiment, the ECM system comprises an adjusting device having a first adjusting apparatus that can be arranged at the positioning apparatus in order to set up the position of the positioning apparatus. And in another embodiment in which the spatial position of the holder can be adjusted relative to the positioning apparatus, the ECM system comprises a second adjusting apparatus for setting up the position of the holder, and said second apparatus can be arranged at the first adjusting apparatus.

Additionally, the positioning apparatus can also comprise a third adjusting apparatus that can be arranged independently from the spatial adjustability of the holder and that is provided for setting up the position of at least one electrode carrier.

The adjusting device in this case can have a single-part or multipart design. An adjusting apparatus is designed, for example, in the form of a model, particularly comprising setting-up surfaces or system surfaces. The setting up of the respective elements in this case is particularly carried out via at least one provided contact of setting-up surfaces or system surfaces also provided for this purpose at the elements of the ECM system to be set up with the corresponding setting-up surfaces or system surfaces at the respective adjusting apparatus. If an element is brought into a provided position at an adjusting apparatus, it is fixed in place in this position and is thus set up or positioned. Additionally, an adjusting apparatus can also comprise connection surfaces at which said adjusting apparatus can be arranged at a set-up arranged fixed in place at the ECM system, or it can be arranged at another adjusting apparatus, and/or can be connected with said apparatus, or at which at least one other adjusting apparatus can be arranged and/or connected to the latter.

In a second aspect of the invention, a method is proposed for preparing in advance an ECM system for holding and machining at least one component. The ECM system in this case has a positioning apparatus for positioning a machining platform and a holder for arranging a clamping apparatus and at least one component. The method has the following steps:

a) arranging an adjusting device at the positioning apparatus;
b) adjusting the positioning apparatus;
c) arranging the machining platform at the set-up positioning apparatus; and
d) arranging the clamping apparatus at the holder.

The ECM system in this case corresponds to an ECM system as described in the preceding and correspondingly has at least one or more of the features as described above. The adjusting device may have a single-part or multipart design and comprise, for example, a first, a second, and a third adjusting apparatus. In the case of the method, initially a first adjusting apparatus is arranged at the positioning apparatus provided particularly for positioning the machining platform. The elements of the positioning apparatus in this case contact set-up surfaces or system surfaces of the first adjusting apparatus and are thus moved at the particularly provided spatial position. The elements of the positioning apparatus are fixed in this position in step b) and correspondingly in this case the positioning apparatus is adjusted or set up.

After setting up the positioning apparatus, in step d) the machining platform can be arranged at the adjusted positioning apparatus, and in step f), the clamping apparatus, particularly with at least one component arranged thereon, can be placed on the holder.

With the proposed method, a machining platform can be precisely positioned in a simple way in the ECM system and opposite the holder. The ECM system is thus prepared in advance such that components arranged on the holder are movable in a defined way relative to the machining platform.

In one embodiment of the method or in the case of a correspondingly designed ECM system, or in an additional step c), which is carried out after step b), the holder is adjusted opposite the adjusting device. For this purpose, at least one corresponding set-up surface or system surface can be provided at the adjusting device, or a second adjusting apparatus can be provided, which serves for setting up the holder. In this case, the second adjusting apparatus may be designed integrally with the first adjusting apparatus, or it can be arranged at the latter apparatus, and/or it can be designed so that it can be connected therewith. In particular, a holder designed to be rotatable can be centered relative to the positioning device during the setting up.

In another possible embodiment of the method for preparing in advance an ECM system, prior to step f), the step e1) is carried out, in which a second adjusting apparatus is arranged at the holder, and a step e2), in which an electrode carrier arranged at a machining station or an electrode arranged thereon is adjusted to a provided position opposite the holder by means of a second adjusting apparatus. Optionally, step e2) can be repeated after step e1) has been carried out again, whereby a second adjusting apparatus is arranged particularly at another position at the holder, and this is particularly repeated for the number of machining stations arranged at the machining platform. The independent adjusting of tools in advance, without a component arranged on the holder, additionally makes possible a savings in time in the case of retrofitting for other components.

Another aspect of the invention relates to an arrangement of several ECM systems for the flexible machining of identical and/or different components. In this case, a component arranged at a clamping apparatus, after a machining in a machining platform of a first EMC system, in particular together with the clamping apparatus, can be arranged in a holder of a second ECM system, in which the component can be held in accurate position, and, in particular, can be machined as positioned without additional positioning relative to the machining platform of the second ECM system.

The ECM systems of the arrangement of several ECM systems are designed in this case corresponding to at least one embodiment of the ECM system described in the preceding and can be prepared in advance for a flexible machining of components by a method for advance preparation of an ECM system according to one embodiment of the method described above.

Particularly by the use of machining platforms that can be arranged interchangeably in ECM systems, the configuration of individual ECM systems of the arrangement can be flexibly combined relative to the machining steps provided on the individual ECM systems. Thus, for example, by a flexible design of the machining platforms that can be used flexibly in different ECM systems, an integration of set-ups necessary for specific machining steps, such as rinsing chambers, or other additional features can be integrated into the proposed arrangement of ECM systems as simply and easily as possible via the selection and configuration of the machining platforms. Therefore, the arrangement of ECM systems makes available a high degree of manufacturing flexibility. In addition, it is possible in a comparatively simple way to avoid an additional correspondingly designed ECM system 10 in the case of disruptions on one ECM system.

BRIEF DESCRIPTION OF THE DRAWING FIGURES

Further features, advantages and application possibilities of the invention result from the following description in connection with the figures. Herein:

FIG. 1*a* shows a schematic three-dimensional representation of an excerpt from an exemplary ECM system according to the invention;

FIG. 1*b* shows a schematic view from the top onto the excerpt from an exemplary ECM system according to the invention shown in FIG. 1*a*;

DESCRIPTION OF THE INVENTION

Figure 1A:
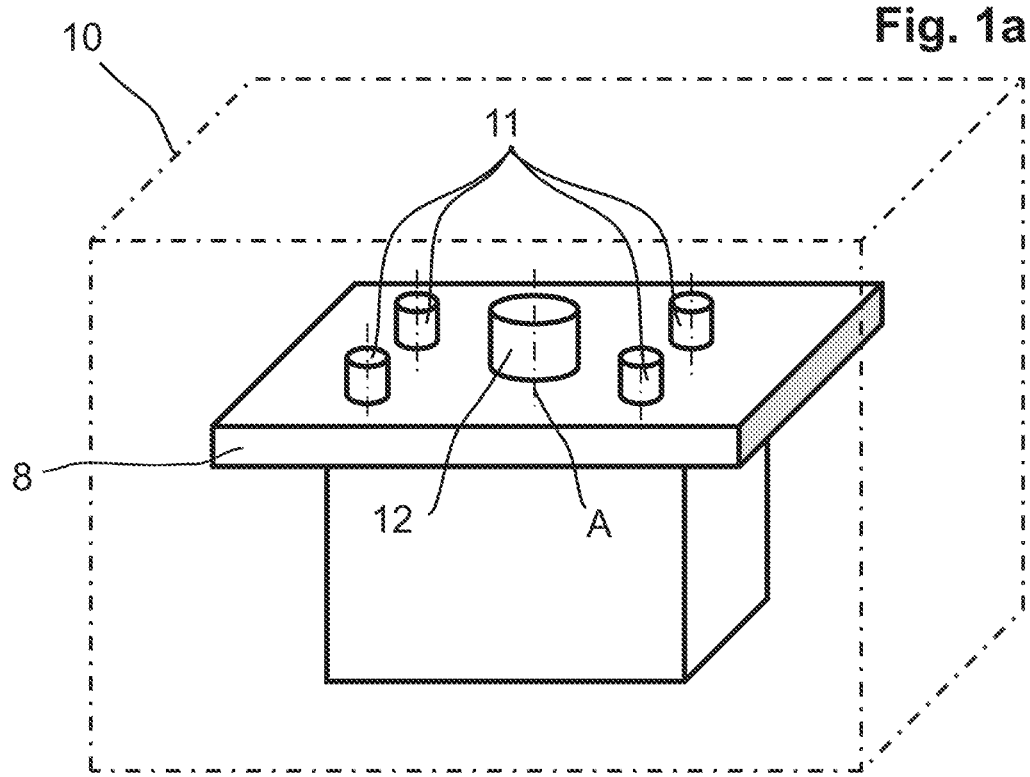

FIG. 1*a* shows a schematic three-dimensional representation of an excerpt from an exemplary ECM system 10 according to the invention. The ECM system 10 has a holder 12 arranged on a machine table 8 for arranging at least one component 50 to be machined (see FIG. 5) and with at least one machining station 22 (see FIGS. 4, 5) for the electrochemical machining of at least one component 50 at at least one machining position. The ECM system 10 has a positioning apparatus 11 which can be spatially set up, relative to which the spatial position of the holder can be designed as adjustable. The positioning apparatus 11 is designed to mount a machining platform 20 (see FIGS. 4,5) arranged thereon after said setting up in a predetermined position, wherein the machining platform 20 has at least one machining station 22 having at least one electrode 25 arranged thereon (see FIGS. 4,5), which can move along a machining path in order to machine at least one component 50 that can be arranged at the holder 12. In order to provide the machine table 8 of the ECM system 10, a surrounding housing (not shown) is provided, whereby the machining can be carried out in an encapsulated manner relative to the environment.

Figure 1B:
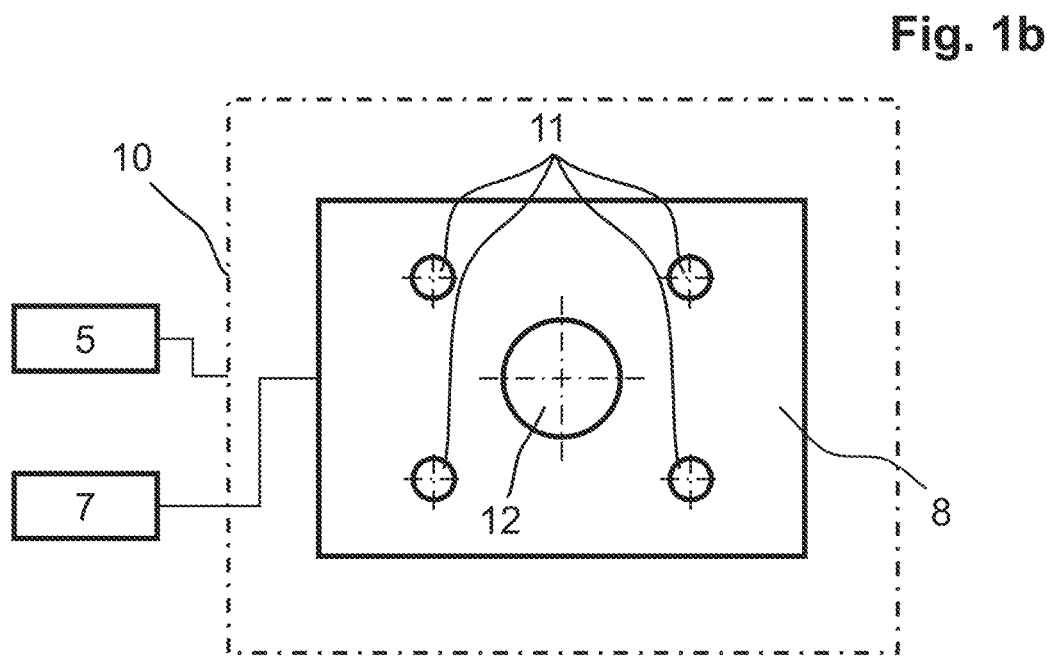

FIG. 1*b* shows a schematic view from the top onto the excerpt of an exemplary ECM system according to the invention shown in FIG. 1*a*, wherein identical elements of the ECM system 10 are provided with identical reference numbers. The ECM system 10 has correspondingly at least one positioning apparatus 11 having four adjustable pickups and a holder 12, as well as a supply apparatus 7 with media connections (not shown) as well as a control apparatus 5 for controlling the ECM system 10.

Figure 2:
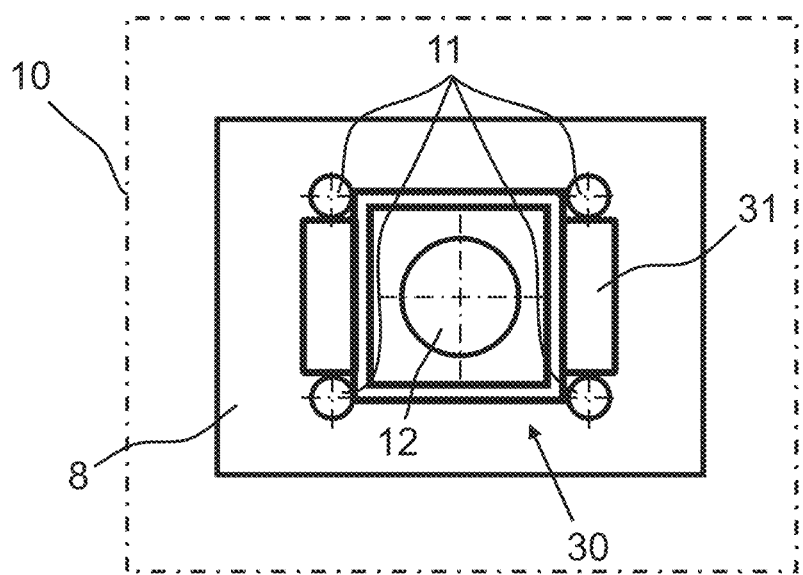
FIG. 2 shows the schematic view from the top from FIG. 1*b*, wherein a first adjusting apparatus of an adjusting device is arranged at the ECM system.

FIG. 2 shows the schematic view from the top from FIG. 1b, wherein a first adjusting apparatus 31 of an adjusting device 30 is arranged at the ECM system 10. The first adjusting apparatus 31 serves for the spatial setting up of the positioning apparatus 11, the four pickups of which that are arranged in a rectangle or square are applied against the first adjusting apparatus 31 via contact surfaces. In this way, said pickups are moved into or set up in a predetermined position relative to the first adjusting apparatus, and are fixed in place there, for example, by means of a zero-point clamping system.

Figure 3:
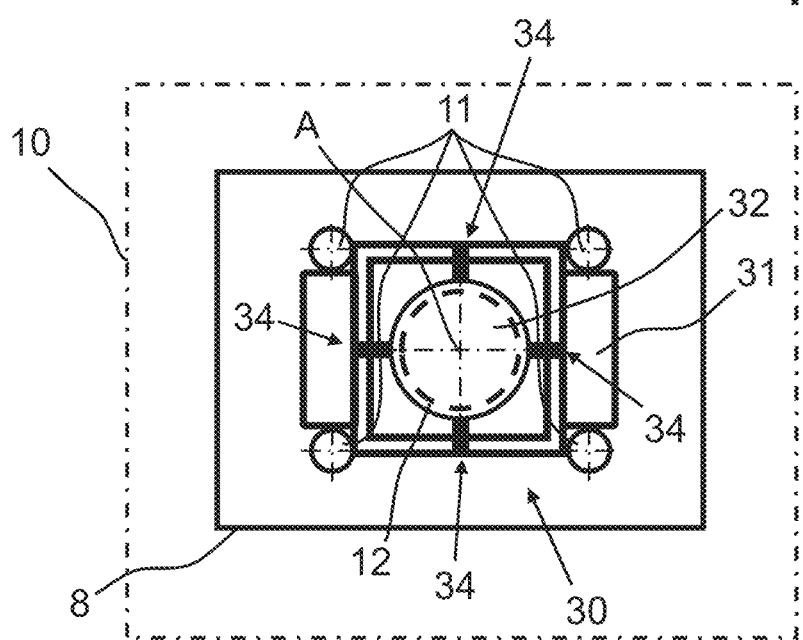
FIG. 3 shows the schematic view from the top from FIG. 1*b*, wherein a first adjusting apparatus and a second adjusting apparatus of the adjusting device are arranged at the ECM system.

FIG. 3 shows the schematic view from the top from FIG. 1b, wherein a first adjusting apparatus 31 and a second adjusting apparatus 32 of the adjusting device 30 are arranged at the ECM system 10. The first adjusting apparatus 31 serves here for positioning the second adjusting apparatus 32 relative to the positioning apparatus 11, which has already been set up and fixed in place. In this way, the spatial position of a spatially adjustable holder 12 can be set up relative to the positioning apparatus 11. Such a second adjusting apparatus 32 can be precisely mounted at the first adjusting apparatus 31 via fitting surfaces 34, so that in one embodiment of the ECM system with a holder 12 arranged on the ECM system 10 in a spatially movable manner in a suitable way, said holder can be exactly adjusted relative to the adjusting device 30. In the example of FIG. 3, the holder 12 is positioned in the set-up position at the ECM system 10, for example, by means of a suitably designed zero-point clamping system. In particular, in the case of the schematically shown exemplary embodiment, all elements of the ECM system 10 to be set up will be adjusted to the axis of rotation A, whereby a flexible arrangement of the elements, particularly interchangeable elements, of the ECM system 10 is possible. Therefore, for example, in the case of a disruption, the latter can be avoided relatively simply on another correspondingly designed ECM system 10.

Figure 4:
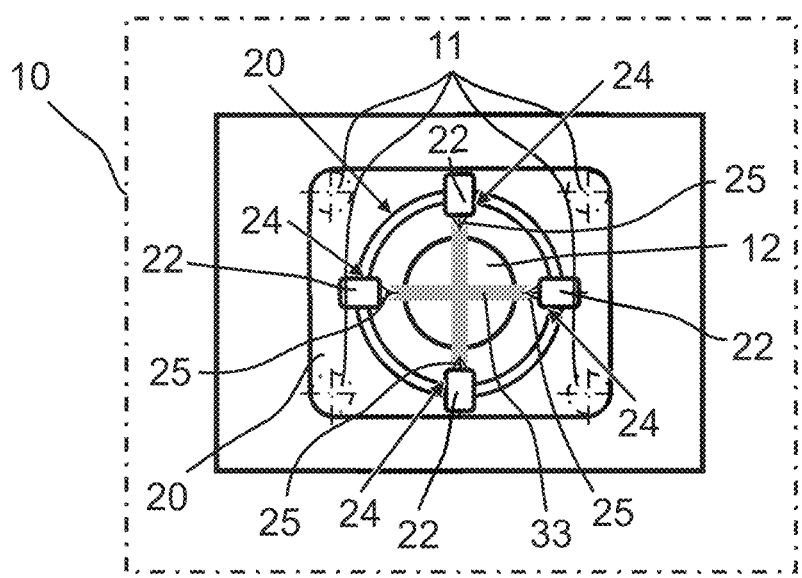
FIG. 4 shows the schematic view from the top from FIG. 1*b*, wherein a machining platform and a third adjusting apparatus of the adjusting device are arranged at the ECM system.

FIG. 4 shows the schematic view from the top from FIG. 1b, wherein a machining platform 20 and a third adjusting apparatus 33 of the adjusting device 30 are arranged at the ECM system 10. The machining platform 20 has four machining stations 22, on which electrodes 25 on electrode carriers 24 are arranged. The third adjusting apparatus 33 is positioned at the holder 12 via fitting surfaces and serves for the spatial positioning and thus for the setting up of the electrodes 25 or the electrode carrier 24 relative to the holder 12.

Figure 5:
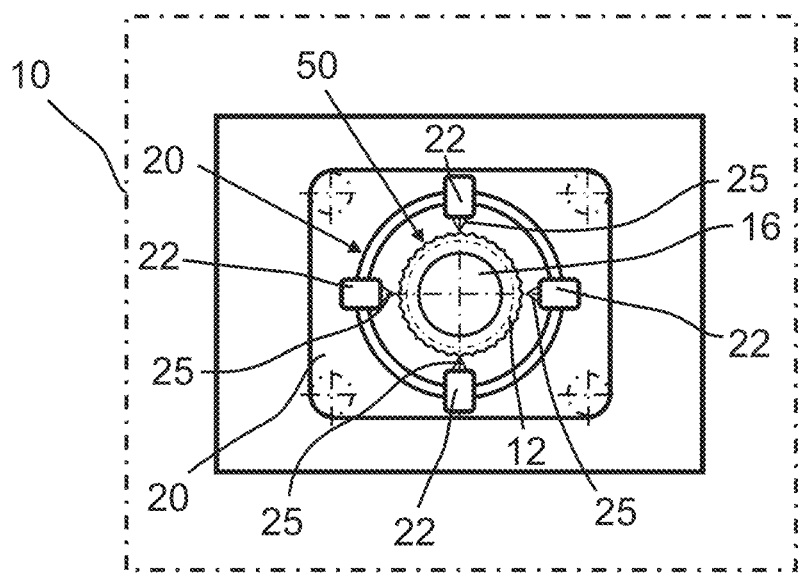
FIG. 5 shows the schematic view from the top from FIG. 1*b*, wherein the machining platform and a component arranged at a clamping apparatus are arranged in the ECM system.

FIG. 5 shows the schematic view from the top from FIG. 1b, wherein the machining platform 20 and a component 50 arranged at a clamping apparatus 16 are arranged in the ECM system 10. The component 50 that particularly can be introduced from the top and can be removed again from the top is positioned on the holder 12, so that it can be moved by a predetermined movement of the holder 12 precisely from one machining position to another. The machining is conducted, for example, by a precise electrochemical machining process (PECM process), wherein several recesses are sunk electrochemically and simultaneously for producing the machining at the periphery of the component 50.

Figure 6:
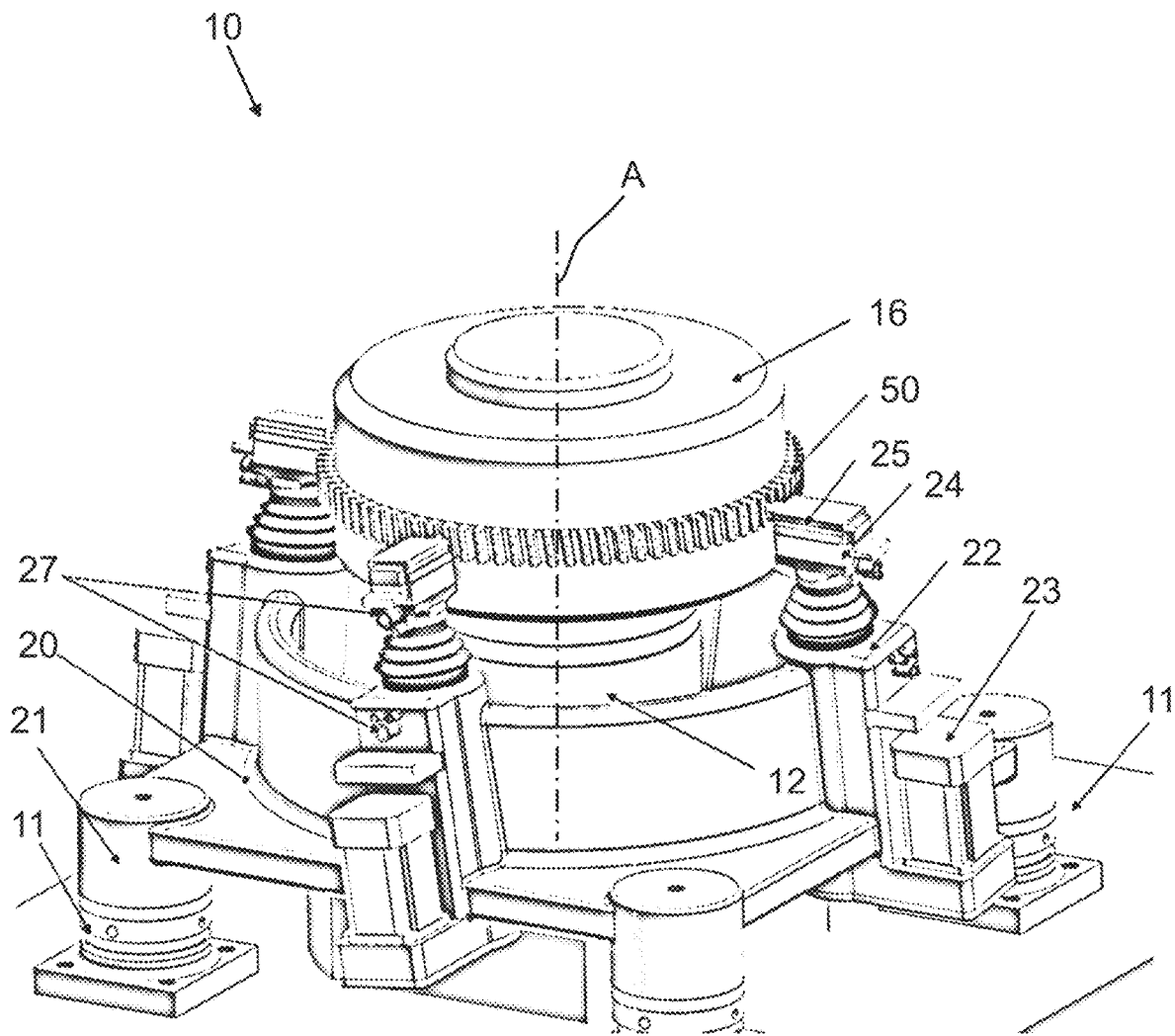
FIG. 6 shows an exemplary three-dimensional representation of the excerpt from another exemplary ECM system according to the invention.

FIG. 6 shows an exemplary three-dimensional representation of the excerpt from an exemplary ECM system according to the invention from FIG. 5. The ECM system 10 has a holder 12 for arranging at least one component 50 to be machined and a machining platform 20 with four machining stations 22 for the electrochemical machining of the component 50 in at least one machining position. The machining stations 22 of the exemplary machining platform 20 have a drive apparatus 23 for driving the electrodes 25 or the electrode carrier 24 on a fixed movement path defined in advance. The predefined movement path in the case of the embodiment example corresponds each time to the axis of movement of the drive apparatus 23 of the particular machining station 22. Thus, a machining of the component 50 can be carried out parallel in time and at local separation from each other in up to four positions. The component 50 of the exemplary embodiment shown is designed as rotationally symmetric and is machined at its periphery, wherein the machining path in this case corresponds to a straight line, in particular, which is arranged at an inclination to the axis of rotation of the component.

The ECM system 10 further has a positioning apparatus 11 that can be set up in space and on which the machining platform 20 can be mounted, positioned in a predetermined position at connection receivers 21 of the machining platform 20, after setting up the positioning apparatus 11. The positioning apparatus 11 is designed in this case so that several machining platforms 20 can be arranged interchangeably thereon. The positioning apparatus 11 has a zero-point clamping system, for example, for positioning the machining platform. The spatial position of the holder 12 can be designed as spatially adjustable relative to the positioning apparatus 11, and also the holder 12 can have a zero-point clamping system for simplifying its set-up. In the exemplary embodiment, each of the machining stations 22 has an electrode 25 arranged thereon, which is movable along a machining path for machining the component 50 arranged on the holder 12. For this, a positionable electrode carrier 24 is provided at each machining station 22, and at least one electrode 25 is arranged on this carrier in a predetermined position. The electrode carrier 24 can also be equipped with a zero-point clamping system for the positioning of the electrodes 25. The component 50 to be machined is arranged in a predefined position at a clamping apparatus 16 and the component 50, together with the clamping apparatus 16, is arranged in a predefined position on the holder 12.

The holder 16 of the exemplary embodiment as defined is designed as movable around the axis of rotation A, in order to move the component 50 arranged thereon into a machining position. Further, supply connections 27 for power and/or media such as, in particular, electrolyte, compressed air, and/or hydraulic fluid are arranged at the machining platform 20. In this case, the electrolyte flow is produced integrally, for example, through the electrode 25 or in a counterflow process, or by means of a pressure chamber (passive or active rinsing chamber) arranged and controlled at the machining platform 20. In the exemplary embodiment, each machining station 22 is operated in stand-alone manner, in particular relative to advance, voltage, electrolyte supply, particularly by means of a control apparatus. Thus, a combination of individual advance is basically also possible with the use of common ECM parameters. Thus, for example, the admissible current load on the component 50 can be determined by selection of the machining parameters and/or by the number of electrodes 25 found in the procedure, so that disruptions can be assigned to the particular machining station 22 causing said disruptions.

Figure 7:
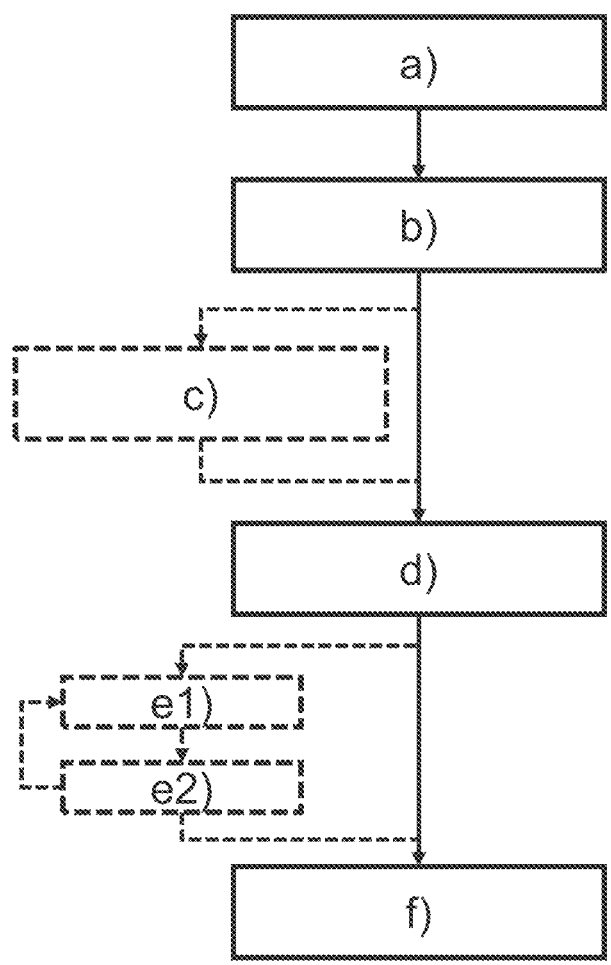
FIG. 7 shows a schematic representation of a flow chart of the method according to the invention.

FIG. 7 shows a schematic representation of a flow chart of the method according to the invention for preparing the ECM system in advance for the holding and machining of at least one component 50. The ECM system 10 in this case has a positioning apparatus 11 for positioning a machining platform 20 and a holder 12 for arranging a clamping apparatus 16 to at least one component 50.

The method according to the invention has the following steps: In a first step a), an adjusting device 30 is arranged at the positioning apparatus 11. In the second step b) an adjusting of the positioning apparatus 11 is then produced. In an optional third step c), depending on the design of the ECM system, the holder 12 can be adjusted relative to the adjusting device 30. For this purpose, for example, a second adjusting apparatus 32 can be employed. In the fourth step d), the machining platform 20 is arranged at the adjusted positioning apparatus 11, and in a fifth step f), the clamping apparatus 16 is arranged at the holder 12.

Optionally in the method and prior to the fifth step f), the steps e1) and e2) are conducted, wherein in step e1), a second adjusting apparatus 32 is arranged at the holder 12, and in the step e2), an electrode carrier 24 arranged at a machining station 22 or an electrode 25 arranged thereon is adjusted relative to the holder 12 by means of the second adjusting apparatus 32. In this case, the step e2) can optionally be executed repeatedly after a repeated carrying out of step e1), in particular corresponding to the number of machining stations 22 arranged at the machining platform 20.

What is claimed is:

1. An electrochemical machining system, comprising:
   a machine table;
   a holder residing on the machine table; the holder being configured and arranged for receiving at least one component to be machined; the holder being spatially adjustable;
   a positioning apparatus residing and directly mounted on and in direct contact with the machine table; the positioning apparatus being spatially adjustable; and
   a first machining platform releasably mounted on the positioning apparatus; the first machining platform including at least one machining station each having at least one electrode; the at least one electrode being configured and arranged to electrochemically machine the at least one component received on the holder; wherein a positionable electrode carrier is arranged in each at least one machining station, and at least one electrode is arranged on each electrode carrier.

2. The electrochemical machining system according to claim 1, wherein the spatial position of the holder is adjusted opposite the positioning apparatus.

3. The electrochemical machining system according to claim 1, further comprising a second machining platform including at least one machining station each having at least one electrode; the first machining platform and the second machining platform being interchangeably mounted to the positioning apparatus.

4. The electrochemical machining system according to claim 1, further comprising a clamping apparatus to secure the at least one component to be machined to the spatially adjustable holder.

5. The electrochemical machining system according to claim 1, wherein the holder is movable about an axis of rotation and/or along at least one movement path to configure and arrange the at least one component thereon into a machining position.

6. The electrochemical machining system according to claim 1, wherein the first machining platform, holder and/or electrode carrier are mounted with a zero-point clamping system.

7. The electrochemical machining system according to claim 1, wherein supply connections for power and/or media including electrolyte, compressed air, and/or hydraulic fluid, are provided on the machining platform.

8. The electrochemical machining system according to claim 1, wherein several machining stations operated in parallel are arranged at the machining platform, so that a machining can be carried out that is parallel in time and at several positions that are locally distanced from one another and arranged on the component.

9. The electrochemical machining system according to claim 1, wherein the at least one machining station on the first machining platform has a drive apparatus for driving the electrode or the electrode carrier on a movement path.

10. The electrochemical machining system according to claim 1, further comprising:
    an adjusting device including
      a first adjusting apparatus configured and arranged to spatially position the positioning apparatus;
      a second adjusting apparatus configured and arranged to spatially position the holder; and
      a third adjusting apparatus configured and arranged on the holder to spatially position the at least one electrode carrier and/or spatially position the at least one electrode.

* * * * *